United States Patent [19]

Sugawara

[11] Patent Number: 4,517,576

[45] Date of Patent: May 14, 1985

[54] MULTI-COLOR PEN RECORDING DEVICE

[75] Inventor: Fukuo Sugawara, Tamayama, Japan

[73] Assignee: Alps Electric Co., Ltd., Japan

[21] Appl. No.: 431,060

[22] Filed: Sep. 30, 1982

[30] Foreign Application Priority Data

Feb. 25, 1982 [JP] Japan .......................... 57-26085[U]

[51] Int. Cl.$^3$ .............................................. G01D 15/16

[52] U.S. Cl. .................................. 346/139 R; 346/46; 346/139 B

[58] Field of Search ..................... 346/46, 139 R, 141, 346/49, 50, 136; 400/144.2

[56] References Cited

U.S. PATENT DOCUMENTS

| | | | |
|---|---|---|---|
| 4,274,102 | 6/1981 | Lum | 346/139 R |
| 4,338,034 | 7/1982 | Babler | 400/144.2 |
| 4,405,931 | 9/1983 | Fujisawa | 346/139 R |

*Primary Examiner*—E. A. Goldberg
*Assistant Examiner*—Gerald E. Preston
*Attorney, Agent, or Firm*—Guy W. Shoup

[57] ABSTRACT

The invention relates to a multi-color pen recording device suitable for a data recording instrument in which a rotary drum supporting a plurality of different colored pens around its periphery is mounted on a carriage which can be driven laterally across the recording paper, which can itself be driven longitudinally, so that the longitudinal axes of the rotary drum and the pens are perpendicular to the paper. The rotary drum is rotated under the guidance of a control system until the selected pen is in the writing position, and then a pen pressing means presses that pen towards the recording paper so as to touch it, so that as the recording paper is driven longitudinally and the carriage is driven laterally, the data can be drawn by the selected pen on the paper.

3 Claims, 14 Drawing Figures

PRIORT ART

MULTI-COLOR PEN RECORDING DEVICE

This invention relates to a multi-color pen recording device suitable for an X-Y plotter, a graphic printer, an alphanumeric printer, etc., and an object of this invention is to perform multi-color recording by speedily changing the color of the pen during recording using a simple mechanism.

A conventional multi-color pen recording device of this kind, for instance an X-Y plotter, is constituted as shown in FIG. 1 in which a carriage (2) holding a single pen is slidably mounted in the X-axis direction on a slide arm (1) and this slide arm (1) is slidably mounted in the Y-axis direction along a fixed arm (4). To change color in this configuration, the slide arm (1) and the carriage (2) are driven to return the pen (3*a*) held by the carriage (2) to a prescribed pen holder in the fixed arm (4), and then the slide arm (1) and the carriage (2) are moved to allow the carriage (2) to pick up another pen, for instance pen (3*b*). However, in this configuration, the pens have to be picked up and replaced individually, making a complicated mechanism (for the pen change) and troublesome control necessary, which takes up space, and the color changing operation has a very slow response.

Because of this, the configuration shown in FIG. 2 has also been considered, in which a slide arm (7) mounted with a carriage (6) moving in the X-axis direction is conveyed in the Y-axis direction along a fixed arm (8) and a plurality of pens (5*a*), (5*b*), (5*c*) are mounted on the carriage (6) to eliminate the necessity for pen-exchange operations. In this case, although pen-exchange is not required, in order to push the desired pen in the carriage (6) down towards the paper surface, a driving means (for instance, an electromagnet) for each pen or a common driving means for the pens and a driving means for selectively changing the color of each pen needs to be provided, causing a disadvantage that the miniaturization of the carriage and reduction of its weight are difficult, and also a control function or the like of the carriage (6) corresponding to the change of the pen position is necessary when the color of the pens is changed during recording because the position in the carriage (6) is different for each pen.

BRIEF DESCRIPTION OF THE DRAWINGS

FIGS. 3 through 12 are diagrams of embodiments of a multi-color pen recording device according to the present invention, in which FIG. 3 is an exploded view of the principal parts partially simplified.

FIG. 4 is a side view of the principal parts showing the printing state.

FIGS. 5 and 6 are a base view and sectional view respectively of the relative positions of the rotary drum and the locking member and the positioning of the rotary drum.

FIGS. 7 and 8 are base and sectional views respectively of the relative relationship of the rotary drum to the locking member and the rotatable state of the rotary drum.

FIG. 9 is a perspective view of the locking member.

FIG. 10 is an enlarged plan view of the engagement part of the locking member.

FIG. 11 is an elevation showing the rotary drum engaged with the rotary cam.

FIGS. 12 and 13 show others modification to the rotary mechanism of the guide shaft, in which FIG. 12 is a plan view of a rotary mechanism.

FIGS. 14 (A), (B) are plan and elevation views respectively of a rotary mechanism.

DETAILED DESCRIPTION OF PREFERRED EMBODIMENTS

Figure 1:
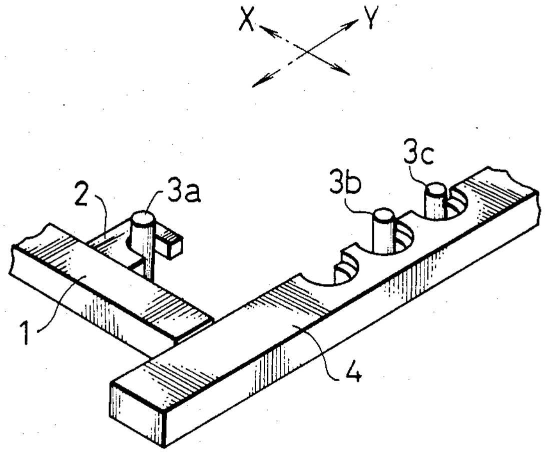
PRIOR ART Fig.1
FIG. 1 is a diagram of a first conventional device.
Figure 2:
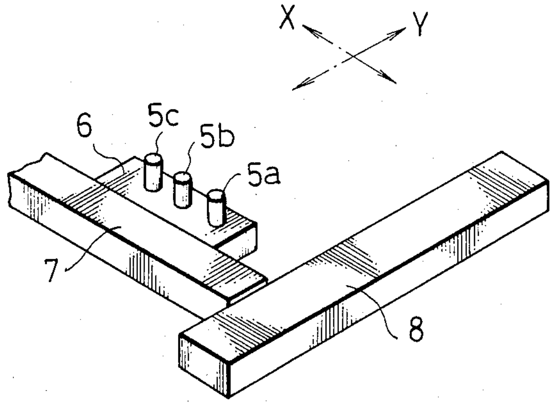
FIG. 2 is a diagram of a second conventional device.

This invention is designed to solve the above disadvantages, and embodiments thereof will be described below with reference to FIGS. 3 to 12.

This embodiment relates to a graphic printer which can print alphanumeric characters.

In the figures, numerals (11), (12) are the side frames of the printer, a carriage (15) is slidably mounted across the surface of the recording paper (16) on two guide shafts (13), (14) supported between said side frames (11), (12). The guide shaft (14) is rotatably supported between the side frames (11), (12). The two ends of a cord (17) are connected to the sides of said carriage (15), and said cord (17) is wound around a driving pulley (20) of a pulse motor (19) which can turn in both directions, and an intermediate part said cord is guided by pulleys (18). In this manner, the carriage (15) is moved along the guide shafts (13), (14) in accordance with the forward or backward rotation of the pulse motor (19). Numeral (21) designates a platen which is used both as a printing base and a paper feeder, and a gear wheel secured to the end of a shaft (22) integrally rotating with the platen (21) is coupled to a driving gear (24) of a pulse motor (23) which can rotate in both directions for paper feed through a suitable intermediate gear with details not shown in the figure.

The recording paper (16) held between the platen (21) and an auxiliary roller (25) (refer to FIG. 4) resiliently pressed against the platen, is conveyed in a direction at right angles to the direction of movement of said carriage (15) in accordance with the rotary motion of the pulse motor (23).

Figure 4:
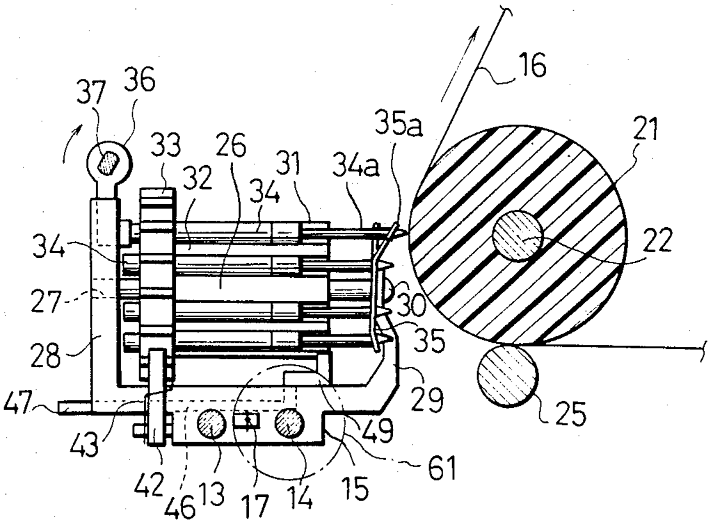

Numeral (26) designates a basically columnar rotary drum of synthetic resin-arranged between a front plate (28) and a rear plate (29), as shown in FIG. 4, and a supporting shaft (27) protruding from the front plate (28) is inserted into the center of the front surface of the rotary drum (26) while a shaft (30) protruding from the center of the rear surface of the rotary drum (26) is inserted into the rear plate (29), thus rotatably supporting the rotary drum (26). A plurality of pen sliding grooves (31) are provided around the periphery of the rotary drum (26) in a circle centered on the axis of the rotary drum (26) at equal intervals around the periphery of said drum, and a pen holding protruding strip (32) is formed on either side of each sliding groove (31). A plurality of pen means (34) are projectably inserted each into one of said pen sliding grooves (31), each of these pen means (34) being a pen which is light weight with a low cost such as a refill for a ball-point pen or a felt-tip pen of fine diameter impregnated with a non-volatile ink, each capable of writing recorded data in a different color on the recording paper (16) by the pen tip (34*a*) of the pen means.

Figure 3:
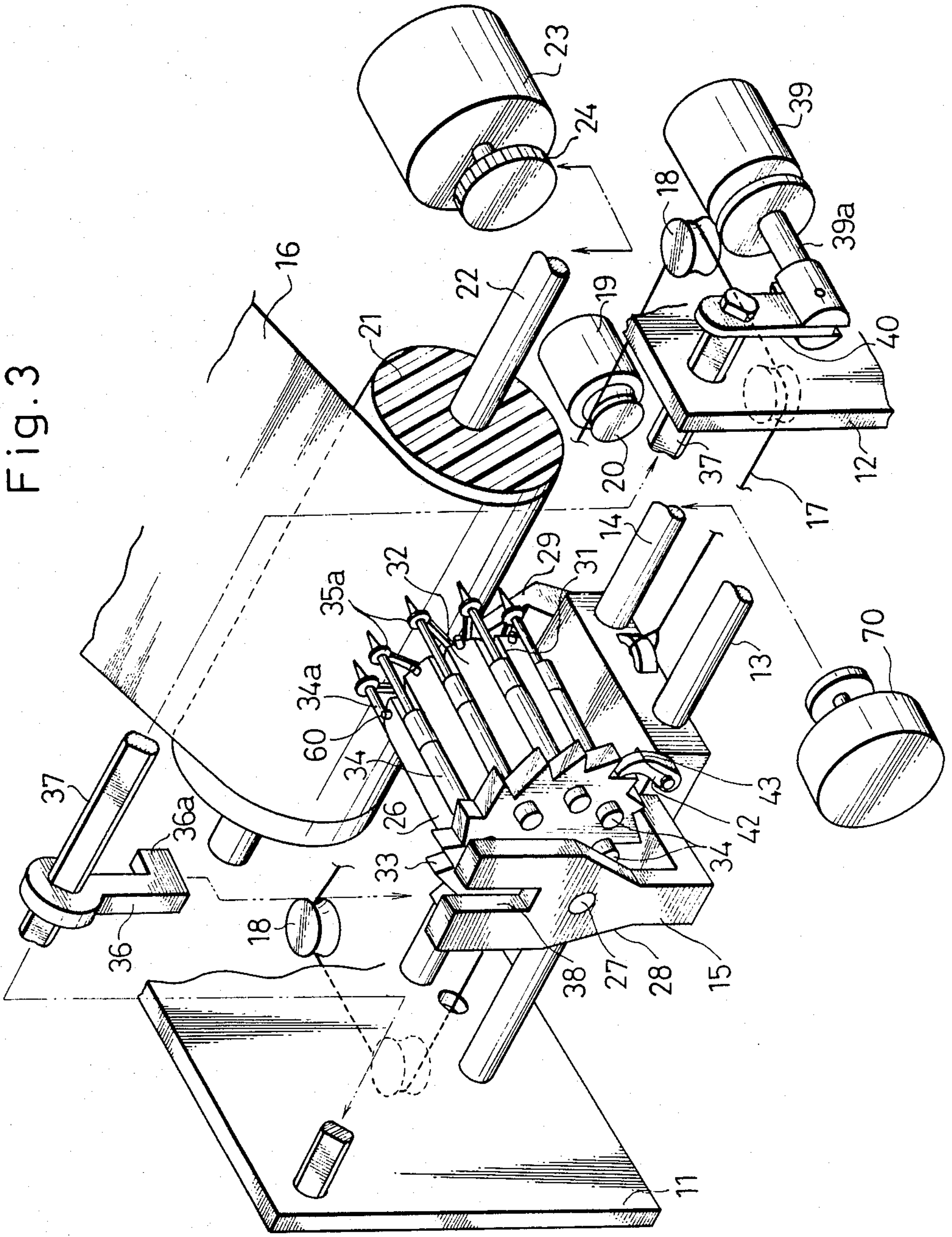

Numeral (33) designates a ratchet wheel secured to or integrally formed with the end face of said rotary drum (26) and provided with ratchets at an equal intervals, the number of ratchets being n times the number of pen means (where n is an integer). Although the ratchet wheel (33) is provided on the end face of the rotary drum (26) in this embodiment, the ratchets could also be provided around the periphery of the rotary drum. In FIG. 3, numeral (42) designates a backward rotation preventing pawl resiliently pressed and engaged with the ratchet wheel (33) by a spring for preventing the ratchet wheel (33) from rotating backwards.

Numeral (35) designates a petal-shaped spring plate, the center of said spring plate (35) is secured to the protruding shaft (30) of said rotary drum (26), resilient arms (35*a*) protrude radially from the center each holding the pen tip (34*a*) of one of said pen means (34) to resiliently press each pen means (34) to the left as shown in FIG. 4. Each pen tip (34*a*) extends through the corresponding resilient arm (35*a*), and the pen tip (34*a*) is moved toward the recording paper (16) by pressing the pen means (34) toward the recording paper (16) against the resilient arm (35*a*).

Numeral (36) designates a hammer for pushing the pen means (34) connected by a spline coupling (a construction that is axially slidable but, which rotates with the shaft) to a hammer shaft (37) the axially supported between said side frames (11), (12). Part of the hammer (36) is always engaged in a groove (38) in the front plate (28) of said carriage (15), and the hammer (36) is also moved together with the carriage (15). The pressing face (36*a*) of the hammer (36) is located opposite the position of the pen means (34) that is at a printing position, all of said pen means (34) having their ends protruding from said ratchet wheel (33), and the end of the pen means (34) at the printing position, that is, at the topmost position as illustrated in the figure, is push in accordance with the turning motion of the hammer shaft (37), so that the pen means (34) at the printing position shown in FIG. 4 is pressed towards the recording paper (16) against said resilient arm (35*a*). Numeral (39) designates an electromagnetic plunger used as the driving means of said hammer shaft (37), the end of said hammer shaft (37) is mounted on a lever (40) attached to a fixed lever (39*a*) of the plunger. The fixed lever (39*a*) is always resiliently pressed by a spring (not shown) in the direction of projection, when the electromagnetic plunger (39) is not excited, said hammer (36) is removed from the end of the pen means (34) and when the electromagnetic plunger (39) is excited, the hammer (36) is pushed against the pen means (34) by the hammer shaft (37).

Accordingly, when the electromagnetic plunger (39) is excited, that is when the pen tip (34*a*) of the pen means (34) is applied to the recording paper (16) with a suitable contact pressure, the pulse motors (19), (23) are driven on the basis of printing commands to move the carriage (15) and the recording paper (16), so that the desired characters, graphs or the like can be drawn on the recording paper (16).

FIGS. 5 through 11 will now be used to describe the positioning and pen selecting mechanism of the rotary drum (26).

As shown in FIGS. 5 through 8, a hollowed groove (44) of a prescribed length is formed in the lower center of the carriage (15) in the axial direction of the rotary drum (26), and a square through hole (45), extending from the lower side to the upper side of base of the carriage (15), is provided in the rear end (on the platen side) of said groove. A locking member (46) is slidably inserted from said hollowed groove (44) into the through hole (45). This locking member (46) is held in the hollowed groove (44) of said carriage (15), extends through the through hole (45) of said carriage (15), protrudes from the upper side of the carriage (15) and is provided with an engagement part (49) having a sloping surface (49*a*) on its top end which engages with a pen sliding groove (31) on the rotary drum (26).

Figure 5:
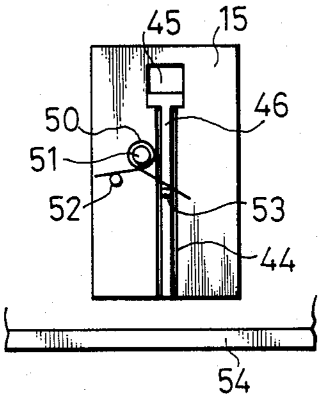
Figure 7:
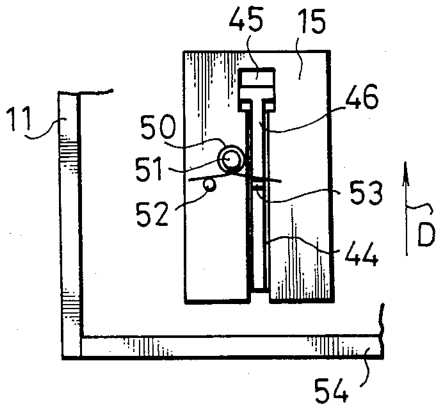
Figure 6:
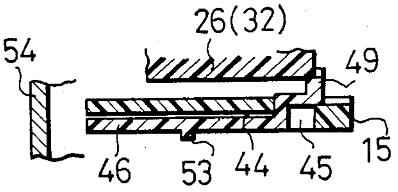
Figure 8:
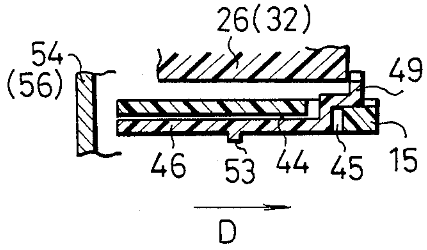
Figure 9:
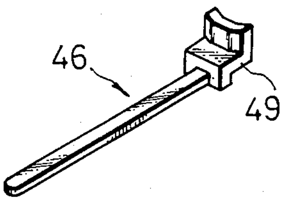
Figure 10:
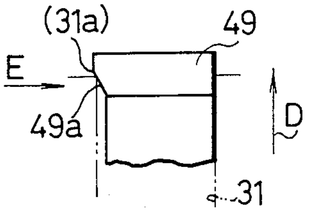
Figure 11:
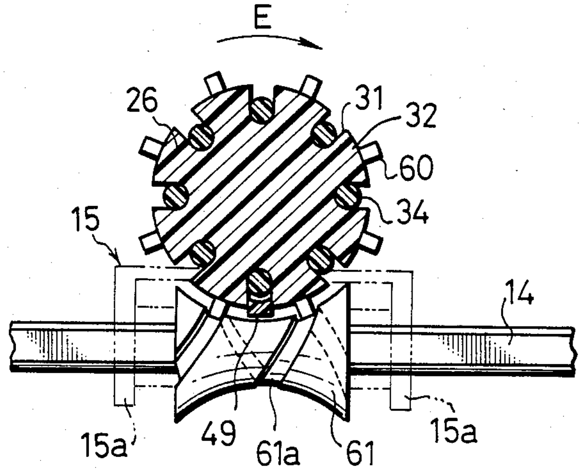

A spring axis (51) supporting a coil spring (50) is provided in the vicinity of said hollowed groove (44) in the lower side of the carriage (15) as shown in FIGS. 5 and 7, and one end of the coil spring (50) is in resilient contact with a supporting pin (52) protruding from the carriage (15) and the other end is in contact with a supporting pin (53) protruding from the locking member (46). Accordingly, the locking member (46) is urged toward a printer front frame (54) by the resiliently of the coil spring (50). This urging force, as shown in FIGS. 10 and 11, engages the engagement part (49) in the pen sliding groove (31) so that a corner (31*a*) of the pen sliding groove (31) is stopped by the sloping surface (49*a*), thus positioning the rotary drum (26). Then a rotational force, applied in the rotary drum (26) to the direction of the arrow E, causes the corner (31*a*) of the pen sliding groove (31) to slide along sloping surface (49*a*), and the locking member (46) is urged in the direction of the arrow D against the force of the spring (50) to turn the rotary drum (26). The sloping surface (49*a*) is formed on only one side of the engagement part (49) at a position facing the direction of rotation (the direction arrow E) of the rotary drum (26), so that if the rotary drum (26) tries to rotate in the reverse direction, the locking member (46) is not slid aside and thus prevents the rotary drum (26) from being reversely rotated.

The rotary drum (26), as shown in FIGS. 3 and 11, is provided with a number of projections (60) that is n times the number of pen means (where n is an integer) at positions corresponding to each pen means (34) on said pen holding protruding strip (32). These protrusions (60), as shown in FIG. 11, are suitably inserted and engaged with an engagement groove (61*a*) of a rotary cam (61) described below. The rotary cam (61) is connected to said guide shaft (14) by a spline coupling so as to be able to rotate and slide but is, held by the sides (15*a*) of the carriage (15) and is moved with the carriage (15). A spirally shaped engagement groove (61*a*) engaging said protrusions (60) is formed circumferentially around the rotary cam (61). The guide shaft (14) is rotated a prescribed amount in one direction by a pulse motor (70) to select the pen required. The rotary cam (61) rotates in accordance with the rotation of the guide shaft (14), and, as described above, the locking member (46) is released from the pen sliding groove (31), and the projection (60) slides along the engagement groove (61*a*). Accordingly, the rotary drum (26) is rotated a prescribed amount (about 45° in this embodiment), and the next pen means (34) is placed opposite the hammer (36), at this position the locking member (46) locks the positioning. This pen·selection is repeated until the required pen means (34) is selected. Accordingly, the pen means can be changed during recording to speedily perform continuous multi-color recording. Furthermore such a configuration can be designed that the rotary drum (26) is turned by forming projections on said rotary cam (61) and grooves in the rotary drum (26) and engaging a projection in a groove.

Figure 12:
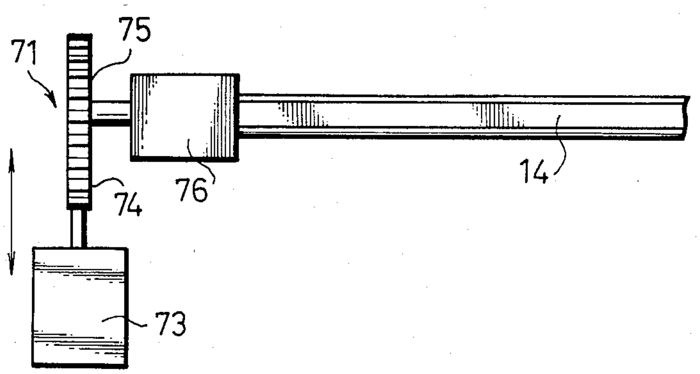
Figure 13:
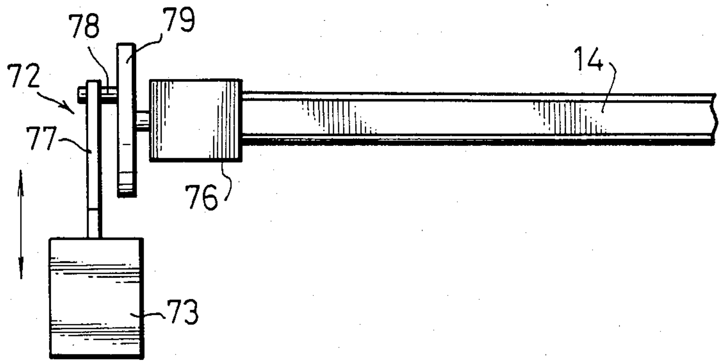
Figure 13:
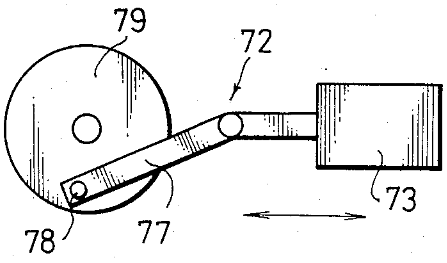

The rotary mechanism of the guide shaft (14) may have such a configuration that a pulse motor is mounted on the carriage (15) and the rotary drum (26) is directly turned by the rotary motion of this pulse motor, while rotary mechanisms (71), (72) equipped with solenoids as shown in FIGS. 12, 13 may be used. The rotary mechanism (71) shown in FIG. 13 has a solenoid (73), a sliding rack (74) connected to the solenoid (73), a gear wheel (75), turning the guide shaft (14) and meshing with said rack (74), and a one-way clutch (76), located between the gear wheel (75) and the guide shaft (14), the linear motion of the solenoid (73) is converted into rotary motion to rotate the guide shaft (14) as appropriate. The rotary mechanism (72) shown in FIG. 13 has a solenoid (73), a crank arm (77) linked to the solenoid (73), a crank disc (79) mounting the crank arm (77) rotatably by a pin (78), and a one-way clutch (76) located between the crank disc (79) and the guide shaft (14), the linear motion of the solenoid (73) is converted into rotary motion to rotate the guide shaft (14) as appropriate. The pulse motor (70) and the solenoid (73), which are the driving means of the rotary mechanism, could be utilized with the above paper feed pulse motor (23) or carriage transfer pulse motor (19) or hammer turning solenoid (39).

If the above pulse motor (70) has a reversible construction so as to rotate the rotary drum (26) clockwise or counterclockwise, so that the pen selection can be performed faster, the ratchet wheel (33), backward rotation prevention pawl (42), etc. become unnecessary.

According to this invention as detailed above, a rotary drum provided with a plurality of pen means is rotated by a simple mechanism to the required position, so that the color can be speedily changed and selected, in this way continuous multi-colored data can be surely and smoothly recorded.

What is claimed is:

1. A recording device for recording data in any of a plurality of colors; including a carriage adapted to be moved across a recording paper and having a rotary drum carrying a plurality of recording pens spaced around the periphery of said drum, said pens being capable of writing in respective colors; means for rotating said drum to bring a selected one of said pens into printing position, said rotation means including a cam carried slidably along a shaft extending along the path of movement of said carriage but rotatable with said shaft, and co-acting means formed respectively on said drum and said cam for rotating said drum upon rotation of said shaft; and means for bringing a pen in said printing position into engagement with said recording paper.

2. A recording device according to claim 1, said co-acting means being formed respectively by projections extending from said drum and a spiral cam groove formed in said cam.

3. A recording device according to claim 1, said drum-rotating means serving to rotate said drum in one direction, and further including means for preventing said drum from rotating in the other direction.

* * * * *